(12) United States Patent
Urion

(10) Patent No.: US 6,742,264 B1
(45) Date of Patent: Jun. 1, 2004

(54) LIMB TRIMMER APPARATUS

(76) Inventor: Christopher Urion, 8 Plumbridge Dr., Levittown, PA (US) 19056

( * ) Notice: Subject to any disclaimer, the term of this patent is extended or adjusted under 35 U.S.C. 154(b) by 0 days.

(21) Appl. No.: 10/300,308

(22) Filed: Nov. 20, 2002

Related U.S. Application Data

(60) Provisional application No. 60/331,604, filed on Nov. 20, 2001.

(51) Int. Cl.$^7$ ................................................ B25G 3/00
(52) U.S. Cl. .......................... 30/340; 30/166.3; 30/244; 30/260; 30/325; 30/342; 30/523; 7/148; 7/167
(58) Field of Search ............................... 30/166.3, 370, 30/371, 373, 504, 514, 517, 522, 523, 256.1, 244, 252, 260, 144, 325, 332, 333, 340, 342, 343; 7/148, 167

(56) References Cited

U.S. PATENT DOCUMENTS

| | | | | |
|---|---|---|---|---|
| 1,338,216 A | * | 4/1920 | Dragus | 30/320 |
| 1,787,057 A | * | 12/1930 | Ottomar | 30/144 |
| 3,760,438 A | * | 9/1973 | White | 7/106 |
| 4,030,150 A | * | 6/1977 | Fisher | 7/145 |
| 4,180,909 A | * | 1/1980 | Lind | 30/332 |
| 4,411,068 A | * | 10/1983 | Theodorides | 30/166.3 |
| 5,058,465 A | * | 10/1991 | Womack | 81/487 |
| 5,829,082 A | * | 11/1998 | Moreira | 7/167 |
| 5,848,474 A | * | 12/1998 | Fortney et al. | 30/392 |
| 5,911,481 A | * | 6/1999 | Yost | 30/125 |
| 6,240,642 B1 | * | 6/2001 | Templeton | 30/125 |

* cited by examiner

*Primary Examiner*—Phong Nguyen
(74) *Attorney, Agent, or Firm*—Krieg DeVault Lundy LLP

(57) ABSTRACT

A limb trimmer apparatus is provided comprising a blade releasably secured to a housing assembly. The housing assembly comprises a housing having first and second flat sides for alternatively securing the blade to the housing assembly in desired extended or storage positions. A clamp and fastener may be provided for selectively securing the blade to one of the first or second flat sides. The blade being secured to the second flat side may be loosened and rotated about the fastener selectively between an extended position and a storage position. The blade being secured to the first flat side may be removed from its extended position in securement thereto and repositioned against the second flat side in the storage position. The clamp is configured with a recess to receive the handle end of the blade and the first or second flat side in either an extended or storage position. Apertures extend entirely through the blade, the clamp and the housing, and are aligned when the blade is properly positioned for securement to the housing assembly, the apertures configured to receive a fastener therein. A handle shaft may be releasably connected to the housing assembly.

30 Claims, 3 Drawing Sheets

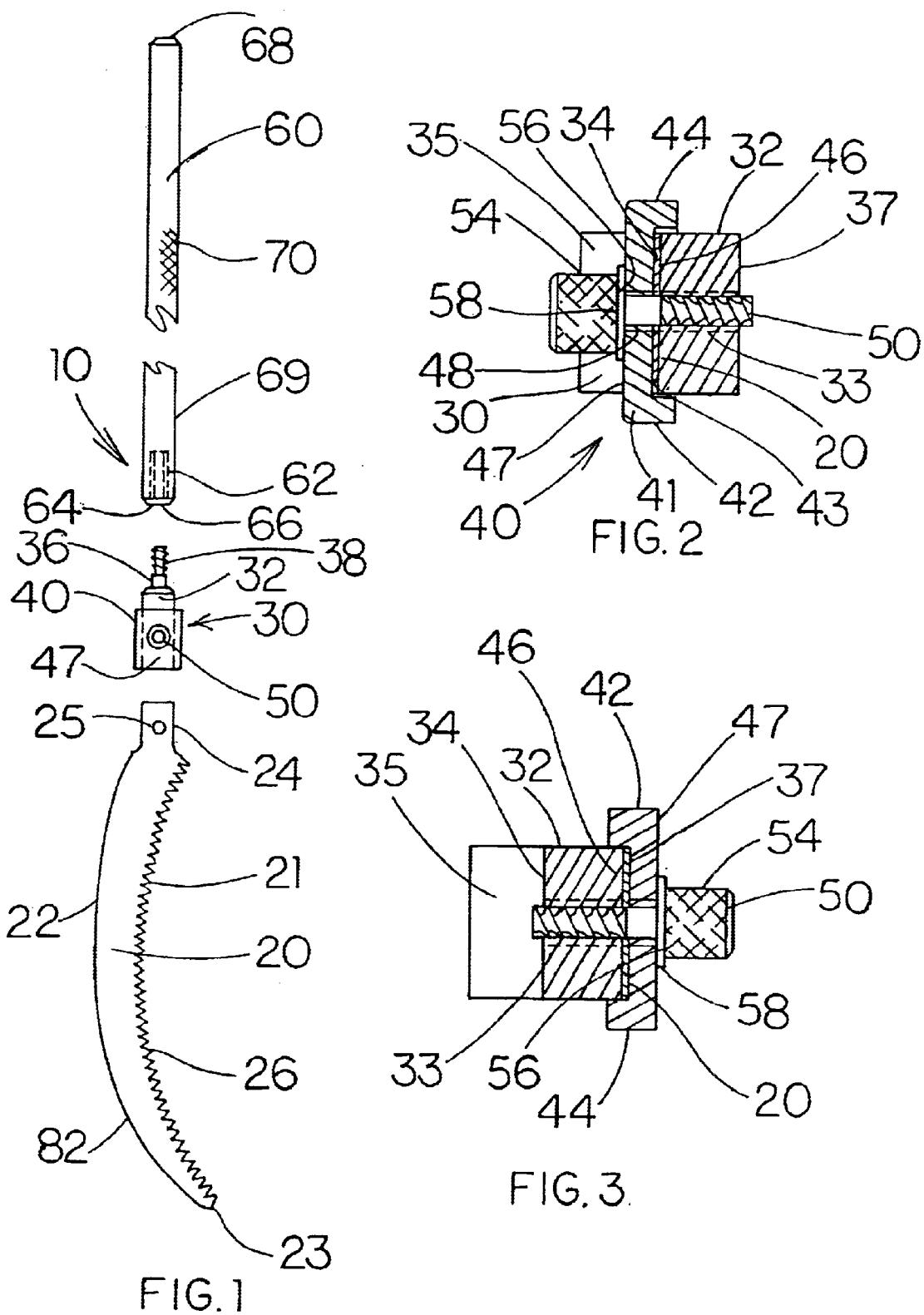

LIMB TRIMMER APPARATUS

This application claims priority based on U.S. Provisional Patent Application Serial No. 60/331,604, entitled "Limb Trimmer Apparatus," and filed Nov. 20, 2001.

BRIEF DESCRIPTION OF THE DRAWINGS

FIG. 1 is an exploded view of the limb trimmer apparatus showing the arch back pruning blade positioned for securement to the housing which is apparatus positioned for securement to a handle;

FIG. 2 is a cross-sectional view of the saw blade releasably secured in an extended position to the first flat side of the housing, in proximity to the axial centerline of the post;

FIG. 3 is a cross-sectional view of the saw blade releasably secured in an extended position to the second flat side of the housing;

DETAILED DESCRIPTION OF EMBODIMENTS OF THE INVENTION

Figure 4:
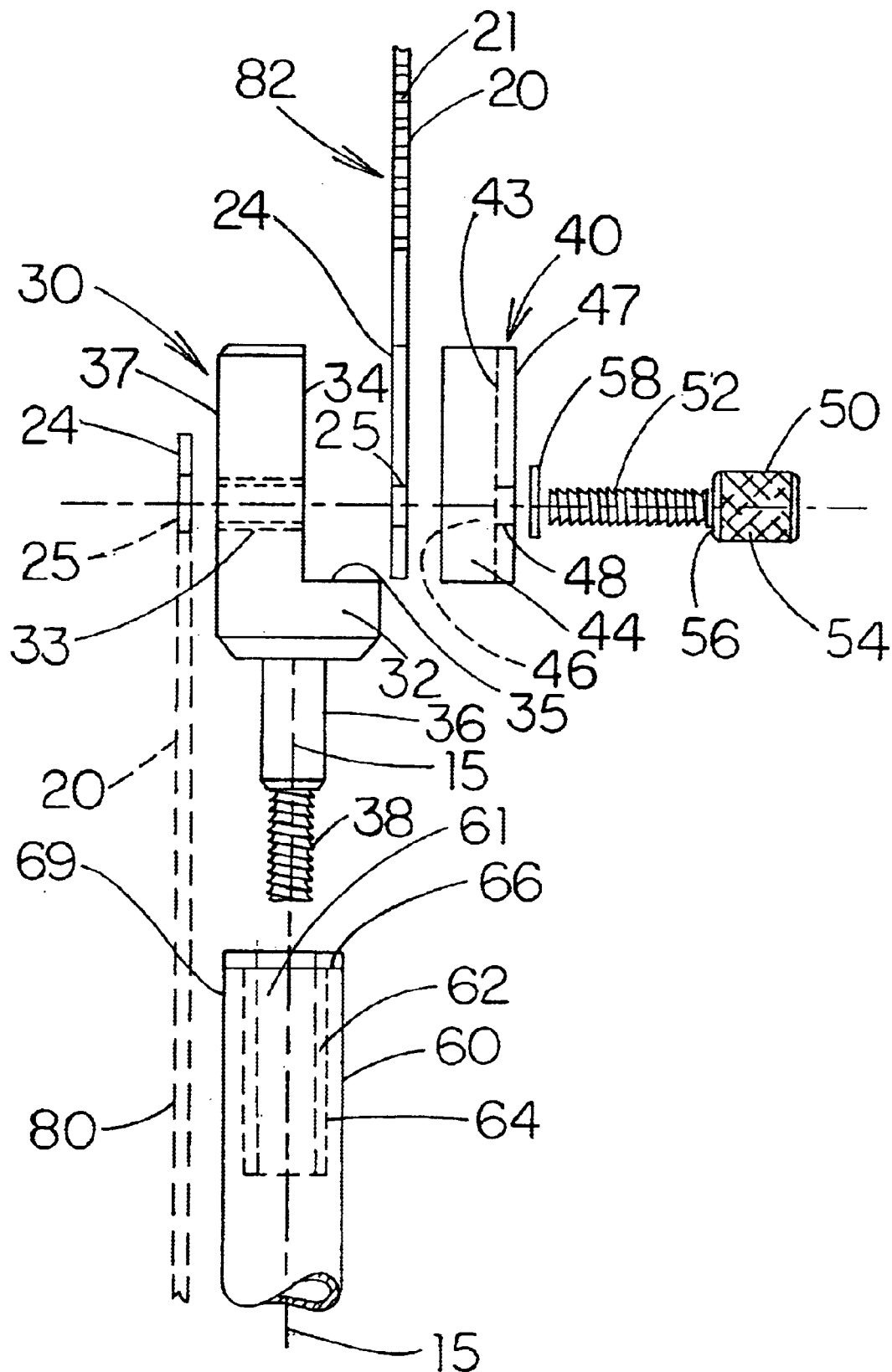
FIG. 4 is an exploded view of the limb trimmer position showing the component parts of the limb trimmer apparatus, a first extended position of the saw blade shown in solid line, a storage position adjacent the handle shown in dashed line.

As shown in FIGS. 1–5, the limb trimmer apparatus 10 comprises a saw blade 20 releasably secured to a housing assembly 30 in one of a plurality of mounting positions within the housing assembly. The mounting positions include extended positions for use of the apparatus and a storage position during periods of non-use. The blade 20 comprises teeth 21 for cutting wood on at least one side, a distal end 23 and a handle end 24. A blade aperture 25 is provided in the handle end 24 of the blade 20. The housing assembly 30 comprises a housing 32 having first and second flat sides 34, 37, an upwardly facing bottom surface 35, a housing post 36, a clamp 40, and a fastener 50. In one embodiment, the apparatus 10 further comprises a handle shaft 60 which releasably connects to the housing post 36.

As shown in FIG. 1, in one embodiment, the saw blade 20 comprises a flat pruning blade having a convex back portion 22 and a concave cutting surface 26 having a plurality of cutting teeth 21. In other embodiments, the cutting teeth 21 are serrated. In yet other embodiments, the saw blade 20 comprises a substantially straight and flat saw blade having wood cutting teeth 21 on one or both sides.

As shown in FIG. 4, in one embodiment, the first flat side 34 is located in linear proximity to the axial centerline 15 extending axially through the housing assembly 30. The blade 20 extends axially from the housing 32 in proximity to the axial centerline 15. The housing post 36 extends from the housing 32 along the axial centerline 15 in a direction opposite the extension of the blade 20 when in an extended position 82. When the blade 20 is secured to the first flat side 34, the blade is generally centered on the axial centerline 15 which, in other embodiments, extends through the handle shaft 60 attached to the housing post 36. As a result, the blade 20 is generally centered on the handle shaft 60.

As also shown in FIG. 4, the second flat side 37 is generally aligned with the outer surface 69 of the handle shaft 60. In this embodiment, the second flat side 37 extends radially a distance from the axial centerline 15 at least the distance that the outer surface extends radially from the axial centerline 15 to enable clearance for the blade 20 to be rotated 180 degrees about the fastener 50 for storage of the blade adjacent to the housing assembly 30 and the handle shaft 60, as described further below.

Figure 5:
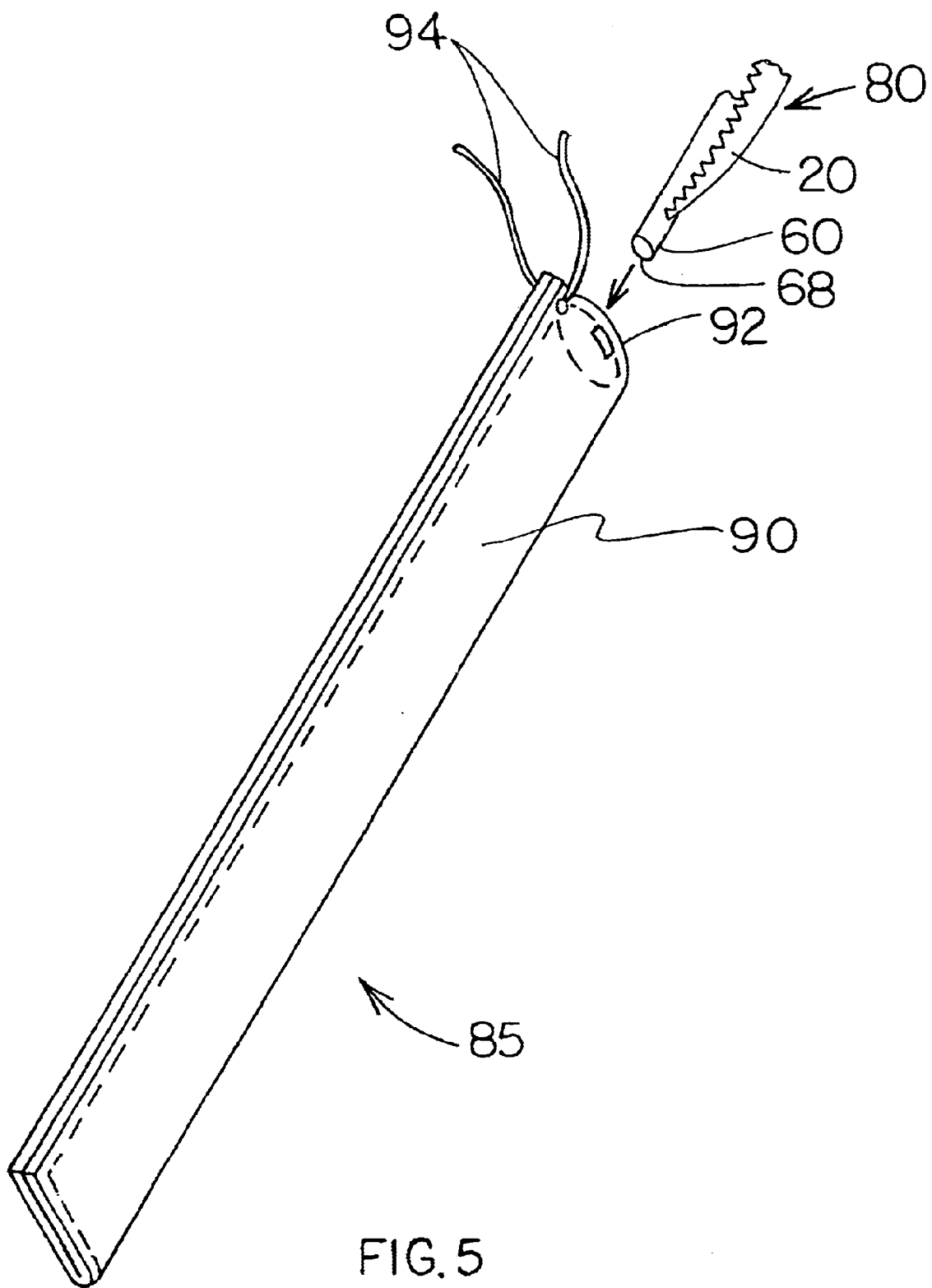
FIG. 5 is a perspective view of the sheath used to store and transport the limb trimmer position with the saw blade secured to the housing in a storage position.

In this embodiment, the blade 20 may be stored in a storage position 80 adjacent to the handle shaft 60 and/or housing assembly 30. According to the storage position 80, the length of the limb trimmer apparatus 10 is shortened for transport and/or storage. In other embodiments, the limb trimmer apparatus 10 may be stored in a protective covering 85 such as a pouch or sheath when not in use and when the blade is put in the storage position. An example of a suitable protective covering 85 in one embodiment of the apparatus 10 is shown in FIG. 5 as a sheath 90. The sheath 90 may be waterproof to reduce corrosion during prolonged transport and/or storage. In other embodiments, an opening 92 is provided in one end of the sheath 90 to receive the limb trimmer apparatus 10 therein. In yet other embodiments, a draw string 94 may be used to releasably secure the limb trimmer apparatus 10 within the sheath 90 during transport and/or storage. In yet other embodiments, other securement means (not shown) for releasably securing the limb trimmer apparatus 10 within the sheath 90 may be used, such as hook and loop fasteners, zippers, snaps and buttons, without departing from the scope of this disclosure or the following claims.

In one embodiment, the blade 20 may be released from its securement against the first flat side 34 and secured against the second flat side 37 in the storage position 80. Securement against the first flat side 34 in other embodiments provides only an extended position 82 for the blade 20. In yet other embodiments, the blade 20 may be loosened from its securement against the second flat side 37 in an extended position 82 and then rotated about 180 degrees and secured against the second flat side 37 in the storage position 80, and vice versa. The blade 20 is rotated from an extended position 82 to a storage position 80 about the fastener 50. The fastener 50 is loosened to rotate the blade 20 and tightened to selectively secure the blade in the extended or storage position 82, 80.

In one embodiment, the fastener 50 may be removed from apertures 25, 33 in the blade and housing (described below) in order to alternate the blade 20 from securement against the first flat side 34 to securement against the second flat side 37 and vice versa. The clamp 40 (described below) is also repositioned opposite whichever flat side against which the blade 20 is secured, as appropriate, when alternating the blade from the first flat side 34 to the second flat side 37 and vice versa.

In one embodiment, the clamp 40 comprises a U-shaped piece 41 comprising a flat portion 45, a first side 42, an inner surface 43, a second side 44 spaced apart from the first side 42, and an outer surface 47. The first side 42 and second side 44 extend in a common direction and generally parallel from opposite ends of the flat portion 45. In other embodiments, the first and second sides 42, 44 of the clamp 40 and the inner surface 43 define a recess 46 configured to overlap and closely receive the blade 20 within the clamp 40. In yet other embodiments, the recess 46 also overlaps and closely receives the first flat side 34 or the second flat side 37 according to the desired position for securing the blade 20 to the housing 32. In yet other embodiments, the aperture 48 extends through the clamp 40 from the outer surface 47 to the inner surface 43 and is sized to receive the fastener 50 therethrough.

In one embodiment, the handle end 24 of the blade 20 is positioned to abut the first flat side 34 in an extended position 82. In other embodiments, the handle end 24 of the blade 20 is positioned to abut the second flat side 37 in either an extended or storage position 82, 80. In yet other embodiments, the handle end 24 of the blade 20 rests on the upwardly facing bottom surface 35 when the blade 20 abuts the first flat side 34.

The clamp 40 receiving the blade 20 and the one of the first and second flat sides 34, 37 within the recess 46 is positioned to squeeze the handle end 24 of the blade 20 between the inner surface 43 of the U-shaped piece 41 and the first or second flat sides 34, 37 as desired. In one embodiment, the housing assembly 30 further comprises a housing aperture 33 extending radially entirely through the housing 32 from the first flat side 34 to the second flat side 37. When the blade 20 is properly positioned for securement to the housing 32, the clamp aperture 48, the housing aperture 33, and the blade aperture 25 are aligned for receiving the fastener 50 therethrough. In one embodiment, the fastener 50 is externally threaded and the housing aperture 33 is internally threaded to threadably receive the threaded fastener 50.

When the blade 20 is properly positioned for securement to the housing 32, the threaded fastener 50 may be tightened until a stop portion 56 of the fastener abuts the outer surface 47 of the clamp 40. The threading of the fastener 50 and the housing aperture 33 are configured so that the fastener 50 may be threadably received by the housing aperture 33 by insertion on either the first flat side 34 or the second flat side 37, as desired.

In one embodiment, a fastener 50 may comprise a grasping end 54. The stop position 56 is located at the bottom of the grasping end 54 adjacent to the threaded position of the fastener 50. In other embodiments, the grasping end 54 comprises a wing nut, knob, or handle, or may alternatively be a bolt or screw head which may have a knurled or otherwise roughened surface for gripping by a user without requiring tools. In yet other embodiments, the fastener 50 comprises a hex bolt having an Allen head generally requiring an Allen wrench for turning or screwing the fastener within the aligned apertures 48, 25, 33. In yet other embodiments, the fastener 50 may be inserted through a washer 58, which may be a flat washer or a locking washer, and which, when the blade 20 is secured, is positioned between the stop portion 56 and the outer surface 47 of the clamp 40 as shown in FIGS. 2 and 3.

The housing 32 and the blade 20 may be manufactured of any appropriate materials. In one embodiment, the housing 32 is made of aluminum. In other embodiments, the blade 20 is made of steel. In yet other embodiments, the blade steel may be selectively coated, heat treated or tempered for enhancing performance, wear resistance, and corrosion resistance as desired. The pitch, tooth form and blade type of the cutting teeth 21 may vary to suit specific blade requirements and manufacturers' recommendations.

In embodiments comprising a handle shaft 60, the handle shaft may be as long or longer than the length of the blade 20. In one embodiment, the blade 20 is from about five inches to about twelve inches long from the handle end 24 to the distal end 23. In other embodiments, the handle shaft 60 is from about fifteen inches to about thirty inches long from the assembly end 66 to the distal end 68 of the handle shaft 60. The handle shaft 60 may have a diameter as desired for comfortable handling and operation of the apparatus 10. In one embodiment, the diameter of the handle shaft 60 is approximately the diameter of a conventional hunting arrow shaft (not shown). In other embodiments, the diameter of the handle shaft 60 is from about ½ inch to about two inches in diameter. The handle shaft 60 may be in the form of a cylindrical shaft or tubing, having generally circular cross-section. In one embodiment, the handle shaft 60 is manufactured of wood. In other embodiments, the handle shaft 60 is manufactured of aluminum. In yet other embodiments, the handle shaft 60 is manufactured of plastic.

In embodiments of the apparatus 10 having a handle shaft 60 about 30 inches long and having a diameter approximately the diameter of a conventional hunting arrow, the limb trimmer apparatus 10 may be stored in a protective covering 85 comprising an arrow quiver (not shown). In embodiments of the apparatus 10 having a handle shaft 60 about 15 inches long, the limb trimmer apparatus 10 may be stored in a protective covering 85 comprising a backpack (not shown).

In one embodiment, a handle shaft 60 is releasably connected to the housing assembly 30. In other embodiments, the handle shaft 60 has an assembly end 66 opposite a distal end 68, the assembly end being releasably secured to the housing post 36. In yet other embodiments, the housing post 36 is externally threaded and the assembly end 66 of the handle shaft 60 defines a cavity 61 that is internally threaded for receiving the threaded housing post 36 therein. In yet other embodiments, the cavity 61 comprises a threaded insert 62 secured in a handle aperture 64 bored axially into the assembly end 66 of the handle shaft. The threaded insert 62 is configured to threadably receive the assembly post 36 therein. The threaded insert 62 may be secured in the handle aperture 64 by means known to those of ordinary skill in the art. In yet other specific embodiments (not shown), the assembly end 66 of the handle shaft 60 is externally threaded and the housing post 36 defines a cavity being internally threaded for receiving the threaded assembly end 66 of the handle shaft 60 therein.

The outer surface 69 of the handle shaft 60 may be coated, textured, wrapped, or otherwise covered at least partially with a suitable grip enhancing surface 70.

Thus, while several embodiments of the limb trimmer apparatus 10 have been disclosed and described herein, numerous modifications and adaptations will become readily apparent to those of ordinary skill in the art, and such modifications and adaptations are intended to be included within the scope of this application and the following claims:

What is claimed:

1. A limb trimmer apparatus, comprising: a saw blade secured to a housing assembly, said saw blade comprising wood cutting teeth on at least one side, said saw blade further comprising a distal end and a handle end, said housing assembly comprising a housing having first and second flat sides facing radially outwardly from an axial centerline of said housing assembly on generally opposite sides of said housing, said housing further comprising a housing post extending axially therefrom in general alignment with said axial centerline and a housing aperture extending entirely through said housing from said first flat side to said second flat side, said saw blade being secured to said housing assembly at said handle end by connection of said handle end to said housing, said handle end being abutted against one of said first flat side and said second flat side and retained by a clamp having a clamp aperture extending therethrough, a fastener being inserted through said clamp aperture, said blade aperture and said housing aperture each being aligned with one another when said saw blade is properly positioned within said housing assembly, said saw blade being rotatable about said fastener when said saw blade is properly positioned against said second flat side, such rotation permitting a user to selectively orient said saw blade between an extended position for use of said apparatus and a storage position during periods of non-use of said apparatus, said saw blade being properly positioned against said first flat side having only an extended position for use of said apparatus, said clamp comprising a U-shaped piece comprising a flat portion and spaced apart first and second sides extending in a common direction generally parallel from said flat portion, said flat portion comprising an inner surface and an outer surface, said inner surface and said first and second sides defining a recess, said recess configured to overlap and closely receive said saw blade and one of said first and second flat sides of said housing therein, said clamp aperture extending entirely through said flat portion from said outer surface to said inner surface, said clamp being positioned within said housing assembly to squeeze said handle end of said saw blade between said inner surface and one of said first and second flat sides, said fastener being externally threaded and said housing aperture being internally threaded for threadably receiving said fastener therein, said apparatus further comprising a handle shaft releasably connected to said housing post, said housing post being externally threaded and said handle shaft comprising an assembly end defining a cavity, said cavity comprising a threaded insert secured within a handle aperture bored axially into said assembly end of said handle shaft, said threaded insert configured to threadably receive said housing post therein.

2. A limb trimmer apparatus, comprising: a saw blade secured to a housing assembly, said saw blade having wood cutting teeth on at least one side, said saw blade further having a distal, end and a handle end, said housing assembly having a housing with first and second flat sides facing radially outwardly from an axial centerline of said housing assembly on generally opposite sides of said housing, said housing having a housing post extending axially therefrom in general alignment with said axial centerline and a housing aperture extending entirely through said housing from said first flat side to said second flat side, said saw blade being secured to said housing assembly at said handle end by connection of said handle end to said housing, said handle end being abutted against one of said first flat side and said second flat side and retained by a clamp having a clamp aperture extending therethrough, a fastener being inserted through said clamp aperture and said blade aperture and said housing aperture each being aligned with one another when said saw blade is properly positioned within said housing assembly, said saw blade being rotatable about said fastener when said saw blade is properly positioned against said second flat side, such rotation permitting a user to selectively orient said saw blade between an extended position for use of said apparatus and a storage position during periods of non-use of said apparatus, said saw blade when properly positioned against said first flat side having only an extended position for use of said apparatus.

3. The apparatus of claim 2 wherein said saw blade comprises a pruning blade having a convex back portion and a concave cutting surface having a plurality of wood cutting teeth.

4. The apparatus of claim 3 wherein said cutting teeth are serrated.

5. The apparatus of claim 2 wherein said saw blade comprises a substantially straight and flat blade having a cutting surface on at least one side, each said cutting surface comprising wood cutting teeth.

6. The apparatus of claim 2 further comprising a handle shaft releasably connected to said housing post.

7. The apparatus of claim 6 wherein said handle shaft has a length from about 15 inches to about 30 inches.

8. The apparatus of claim 6 wherein said handle shaft comprises a generally circular cross section.

9. The apparatus of claim 8 wherein said handle shaft has a diameter from about ½ inch to about 2 inches.

10. The apparatus of claim 6 wherein said handle shaft is manufactured of a material selected from the group consisting of wood, aluminum and plastic.

11. The apparatus of claim 6 wherein the outer surface of said handle shaft is at least partially covered with a grip enhancing surface.

12. The apparatus of claim 6 wherein said second flat side extends radially from said axial centerline a distance at least the distance that the outer surface of said handle shaft extends radially from said axial centerline.

13. The apparatus of claim 6 wherein said housing post is externally threaded and said handle shaft comprises an assembly end defining a cavity, said cavity being internally threaded for threadably receiving said housing post therein.

14. The apparatus of claim 13 wherein said cavity comprises a threaded insert secured within a handle aperture bored axially into said assembly end of said handle shaft.

15. The apparatus of claim 6 wherein said handle shaft comprises an assembly end that is externally threaded and said housing post defines a cavity that is internally threaded for threadably receiving said assembly end therein.

16. The apparatus of claim 2 wherein said saw blade is releasably secured to said housing assembly at said second flat side of said housing, said saw blade being selectively rotated approximately 180 degrees between said extended position wherein said saw blade extends generally axially from said second side a direction generally opposite said housing post and generally parallel to said axial centerline, and said storage position wherein said saw blade extends from said second side generally adjacent said housing assembly and generally parallel to said axial centerline.

17. The apparatus of claim 2 wherein said clamp further comprises a U-shaped piece comprising a flat portion and spaced apart first and second sides extending in a common direction generally parallel from said flat portion, said flat portion comprising an inner surface and an outer surface, said inner surface and said first and second sides defining a recess, said recess configured to overlap and closely receive said saw blade and one of said first and second flat sides of said housing therein, said clamp aperture extending entirely through said flat portion from said outer surface to said inner surface.

18. The apparatus of claim 17 wherein said clamp is positioned within said housing assembly to squeeze said handle end of said saw blade between said inner surface and one of said first and second flat sides.

19. The apparatus of claim 2 wherein said fastener is externally threaded and said housing aperture is internally threaded for threadably receiving said fastener therein.

20. The apparatus of claim 19 wherein said housing aperture is internally threaded for receiving said fastener therein as said fastener is selectively inserted therein at either said first flat side or said second flat side.

21. The apparatus of claim 19 wherein said fastener further comprises a stop portion that abuts said clamp when said fastener is sufficiently tightened through the aligned said clamp aperture, said blade aperture and said housing aperture.

22. The apparatus of claim 21 wherein said stop portion is located on the bottom of a grasping end of said fastener, said grasping end comprising a grasper selected from the group consisting of wing nuts, knobs, handles, bolt heads, and screw heads.

23. The apparatus of claim 21 wherein said fastener comprises a hex bolt having an Allen head.

24. The apparatus of claim 21 further comprising a washer positioned between said stop portion and said clamp, said washer selected from the group of washers consisting of flat washers and locking washers.

25. The apparatus of claim 2 wherein said housing is manufactured of aluminum.

26. The apparatus of claim 2 wherein said saw blade is manufactured of steel.

27. The apparatus of claim 26 wherein said steel is selectively coated, heat treated or tempered.

28. The apparatus of claim 2 wherein said blade has a length from said handle end to said distal end from about 5 inches to about 12 inches.

29. The apparatus of claim 2 wherein said apparatus when in said storage position is stored within a protective covering selected from the group consisting of a pouch, sheath, quiver and backpack.

30. The apparatus of claim 29 wherein said protective covering is water proof.

\* \* \* \* \*